(12) United States Patent
Frances et al.

(10) Patent No.: US 11,884,001 B2
(45) Date of Patent: Jan. 30, 2024

(54) METHOD FOR MANUFACTURING A SILICONE ELASTOMER ARTICLE USING A 3D PRINTER

(71) Applicants: Elkem Silicones France SAS, Lyons (FR); Universite Claude Bernard Lyon 1, Villeurbanne (FR); Centre National de la Recherche Scientifique (CNRS), Paris (FR); Institut National des Sciences Appliquees de Lyon, Villeurbanne (FR); Universite Jean Monnet Saint Etienne, Saint Etienne (FR)

(72) Inventors: Jean-Marc Frances, Meyzieu (FR); David Mariot, Lyons (FR); Christophe Marquette, Villeurbanne (FR); Edwin-Joffrey Courtial, Villeurbanne (FR); Rene Fulchiron, Saint Didier au Mont d'Or (FR); Clement Perrinet, Villeurbanne (FR)

( * ) Notice: Subject to any disclaimer, the term of this patent is extended or adjusted under 35 U.S.C. 154(b) by 542 days.

(21) Appl. No.: 16/611,693

(22) PCT Filed: May 9, 2018

(86) PCT No.: PCT/EP2018/062088
§ 371 (c)(1),
(2) Date: Nov. 7, 2019

(87) PCT Pub. No.: WO2018/206689
PCT Pub. Date: Nov. 15, 2018

(65) Prior Publication Data
US 2020/0108548 A1     Apr. 9, 2020

(51) Int. Cl.
| | |
|---|---|
| *B29C 64/118* | (2017.01) |
| *C08K 3/36* | (2006.01) |
| *C08L 83/04* | (2006.01) |
| *B33Y 70/10* | (2020.01) |
| *B33Y 10/00* | (2015.01) |
| *B29K 71/00* | (2006.01) |
| *B29K 83/00* | (2006.01) |
| *B29K 105/00* | (2006.01) |
| *B29K 105/24* | (2006.01) |
| *B29C 64/245* | (2017.01) |
| *B29C 64/295* | (2017.01) |
| *B29C 64/209* | (2017.01) |
| *B33Y 80/00* | (2015.01) |

(52) U.S. Cl.
CPC .......... *B29C 64/118* (2017.08); *B29C 64/209* (2017.08); *B29C 64/245* (2017.08); *B29C 64/295* (2017.08); *B33Y 70/10* (2020.01); *C08K 3/36* (2013.01); *C08L 83/04* (2013.01); *B29K 2071/02* (2013.01); *B29K 2083/00* (2013.01); *B29K 2105/0085* (2013.01); *B29K 2105/24* (2013.01); *B33Y 10/00* (2014.12); *B33Y 80/00* (2014.12)

(58) Field of Classification Search
CPC ...................................................... B33Y 10/00
See application file for complete search history.

(56) References Cited

U.S. PATENT DOCUMENTS

| | | | |
|---|---|---|---|
| 4,477,626 A | 10/1984 | Suzuki | |
| 6,121,368 A | 9/2000 | Heying et al. | |
| 2009/0062417 A1* | 3/2009 | Wrobel | C08L 83/04 522/66 |
| 2016/0280918 A1* | 9/2016 | Kumar | H01L 33/56 |
| 2018/0066115 A1* | 3/2018 | Achenbach | C08L 83/04 |
| 2018/0237659 A1* | 8/2018 | Kim | C08G 77/28 |
| 2018/0258229 A1* | 9/2018 | Achenbach | C08L 83/04 |
| 2019/0316005 A1* | 10/2019 | Wang | C08G 18/6208 |

FOREIGN PATENT DOCUMENTS

| | | | |
|---|---|---|---|
| CN | 103937257 A | * | 7/2014 |
| JP | 2016150991 A | * | 8/2016 |
| WO | 2015107333 A1 | | 7/2015 |
| WO | 2016071241 A1 | | 5/2016 |
| WO | 2016188930 A1 | | 12/2016 |
| WO | 2017040874 A1 | | 3/2017 |
| WO | 2017044735 A1 | | 3/2017 |
| WO | 2017081028 A1 | | 5/2017 |
| WO | 2017121733 A1 | | 7/2017 |

OTHER PUBLICATIONS

Structure search results (Year: 2022).*
BYK 333 substance detail information from SciFinder-n (Year: 2022).*
BYK Additives eBook (Year: 2022).*
International Search Report for PCT/EP2018/062088, dated Aug. 8, 2018.

* cited by examiner

*Primary Examiner* — Seyed Masoud Malekzadeh
*Assistant Examiner* — Jennifer L Groux
(74) *Attorney, Agent, or Firm* — McBee Moore & Vanik IP, LLC

(57) ABSTRACT

The invention relates to an additive manufacturing method for producing a three-dimensional elastomer silicone article. The elastomer silicone article is built up layer by layer by printing a silicone composition crosslinkable by addition reactions comprising at least one organopolysiloxane-polyoxyalkylene copolymer with a 3D printer selected from an extrusion 3D printer or a material jetting 3D printer.

18 Claims, No Drawings

METHOD FOR MANUFACTURING A SILICONE ELASTOMER ARTICLE USING A 3D PRINTER

CROSS-REFERENCE TO RELATED APPLICATIONS

This application is the National Stage entry of International Application No. PCT/EP2018/062088, filed 9 May 2018, which claims priority to PCT/162017/000735, filed 10 May 2017.

BACKGROUND

Technical Field

The invention relates to an additive manufacturing method for producing a three dimensional elastomer silicone article. The elastomer silicone article is built up layer by layer by printing a silicone addition crosslinking composition with a 3D printer.

Description of Related Art

Additive manufacturing techniques covers different technologies whose common features is an automative additive buildup of layers of the shaped parts. Addition crosslinking silicone compositions have already been used in additive manufacturing methods to produce a three dimensional elastomer silicone article or part.

WO2015/107333 discloses a 3D printer that comprises an x-y-z gantry robot that includes a material delivery system comprising a mixing chamber, the mixing chamber further comprising a mixer body, a mixer nozzle and a mixing paddle. The material delivery system further comprises a plurality of syringe pumps connectable to the mixing chamber delivering streams of the constituents of a printing material to the mixing chamber. The mixing paddle is threaded through the port block into the mixing chamber, and is rotated by means of a motor to mix the printing material prior to its extrusion from the mixer nozzle. Addition crosslinking silicone compositions comprising polydimethylsiloxane, chains, filler, catalyst and crosslinker. By varying the amount of these components the mechanical properties of the elastomer can be adapted but the desired properties also depend on the set time and viscosity of the silicone compositions and the speed at which the material is printed.

There is a need to provide an additive manufacturing method for the efficient production of high quality shaped silicone parts. One of the main issues linked to the additive manufacturing techniques is that during the layer by layer production each layer has to retain its shape. As the height of product increases the lower layers would not hold their shape and flow and there may be a distorsion or a collapse of the structure. As a result improper shape silicone parts are obtained.

Different solutions have been proposed. WO2016071241 discloses the use of silicone compositions with a viscosity measured at 25° C. and at a shear rate of $0.5 \text{ s}^{-1}$ of at least 10 Pa·s and the use of an spatially controllable source of electromagnetic radiation to crosslink or incipient crosslink the silicone composition after application of the silicone composition to prevent running.

WO2016188930 discloses a method where after the deposition of each layer the pre-structure formed is cured on an oven.

WO2017040874 discloses a method where after printing each layer is at least partially cured by heating prior to the deposition of the subsequent layer.

All these solutions need the implementation of heating or electromagnetic radiation at the same time or between the steps of printing the layers. 3D printers are complexified and printing speed is affected.

SUMMARY

It is an object of the present invention to provide a method that allows a time efficient production of a three dimensional silicone elastomer part.

It is also an object of the present invention to obtain 3D elastomer parts with excellent manufacture accuracy.

It is also an object of the present invention to provide a method for additive manufacturing of silicone elastomers objects without collapse or deformation of the layers at room temperature before curing.

It is also an object of the present invention to obtain 3D elastomer parts with excellent mechanical properties and thermal resistance.

The present invention is a method for additive manufacturing a silicone elastomer article comprising the steps of:
1) printing a first silicone composition on a substrate with a 3D printer selected from an extrusion 3D printer or a material jetting 3D printer to form a first layer,
2) printing a second silicone composition on the first or previous layer with the said 3D printer to form a subsequent layer and
3) optionally repeating step 2) with independently selected silicone composition for any additional layer needed and
4) allowing the first and subsequent layers to crosslink, optionally by heating, to obtain a silicone elastomer article, characterized in that the said silicone compositions are crosslinkable through addition reactions and comprise:
(A) at least one organopolysiloxane compound A comprising, per molecule at least two $C_2$-$C_6$ alkenyl radicals bonded to silicon atoms,
(B) at least one organohydrogenopolysiloxane compound B comprising, per molecule, at least two hydrogen atoms bonded to an identical or different silicon atom,
(C) at least one catalyst C consisting of at least one metal or compound, from the platinum group,
(D) at least one reinforcing silica filler D,
(E) at least one organopolysiloxane-polyoxyalkylene copolymer E and
(F) at least one crosslinking inhibitor F.

DETAILED DESCRIPTION OF A PREFERRED EMBODIMENT

This silicone compositions, crosslinkable through addition reactions between organopolysiloxanes bearing at least two unsaturated bonds and organopolysiloxanes bearing at least two hydrogenosilyl units, have the adequate rheological properties to be used with 3D printers. It is to the credit of the inventors to have found what are the crosslinking silicone compositions with the adequate rheological properties necessary to avoid collapse or deformation of the objects at room temperature before complete curing.

It is not only the fact of the viscosity index which is commonly disclosed as the ratio between the slow shear rate viscosity to the high shear rate viscosity of a non-Newtonian body. It is also related to the speed rise of the viscosity when decreasing the shear rate.

Cure speed is also important as it also increases viscosity and mechanical properties and ensures that the shape is retained, even when the height and the weight of the silicone article increase. To avoid any collapse of the structure it is also important to manage the cure speed of the addition-crosslinking silicone composition with the crosslinking inhibitor.

In the first step, the layer of the first addition-crosslinking silicone composition is printed on a substrate such that the layer is formed on the substrate. The substrate is no limited and may be any substrate. The substrate can support the 3D article during its method of manufacturing as for example the substrate plate of the 3D printer. The substrate can be rigid or flexible and can be continuous or discontinuous. The substrate may itself be supported, for example by a substrate table or plate, such that the substrate needs not to have rigidity. It may also be removable from the 3D article. Alternatively, the substrate can be physically or chemically bond to the 3D article. In one embodiment, the substrate may be in silicone.

The layer formed by printing the first addition-crosslinking silicone composition may have any shape and any dimension. The layer can be continuous or discontinuous.

In the second step, a subsequent layer is formed by printing a second silicone composition on the previous layer, formed in the first step, with an extrusion 3D printer or a material 3D jetting printer. The extrusion 3D printer and the material 3D jetting printer may be the same as or different from the extrusion 3D printer or a material 3D jetting printer utilized in step 1).

The second addition-crosslinking silicone composition may be the same as or different from the first addition-crosslinking silicone composition.

The subsequent layer formed by printing the second addition-crosslinking silicone composition may have any shape and any dimension. The subsequent layer can be continuous or discontinuous.

In the third step, the second step is repeated to obtain as many layers as needed.

In the fourth step, by allowing the layers to complete crosslinking, optionally by heating, a silicone elastomer article is obtained. Crosslinking can be completed at ambient temperature. Usually ambient temperature refers to a temperature between 20 and 25° C.

Heating may be used to accelerate the crosslinking or curing of the layers. A thermal cure after printing can be done at a temperature between 50 and 200° C., preferably between 60 and 100° C., in order to achieve complete cure or crosslinking faster without collapse of the structure.

In this document the term "layer" may relate to the layers at any stage of the method, first or previous or subsequent layer. The layers can be each of various dimensions, including thickness and width. Thickness of the layers can be uniform or may vary. Average thickness is related to the thickness of the layer immediately after printing.

In an embodiment, the layers independently have a thickness of from 50 to 2000 µm, preferably from 100 to 800 micrometers and more preferably from 100 to 600 micrometers In a particular embodiment, no energy source as heat or radiation is applied during or between steps 1) to 3) prior to the printing of at least 10, preferably 20 layers.

3D Printing Disclosure 3D printing is generally associated with a host of related technologies used to fabricate physical objects from computer generated, e.g. computer-aided design (CAD), data sources.

This disclosure generally incorporates ASTM Designation F2792-12a, "Standard Terminology for Additive Manufacturing Technologies Under this ASTM standard, "3D printer" is defined as "a machine used for 3D printing" and "3D printing" is defined as "the fabrication of objects through the deposition of a material using a print head, nozzle, or another printer technology."

"Additive manufacturing (AM)" is defined as "a process of joining materials to make objects from 3D model data, usually layer upon layer, as opposed to subtractive manufacturing methodologies. Synonyms associated with and encompassed by 3D printing include additive fabrication, additive processes, additive techniques, additive layer manufacturing, layer manufacturing, and freeform fabrication." Additive manufacturing (AM) may also be referred to as rapid prototyping (RP). As used herein, "3D printing" is generally interchangeable with "additive manufacturing" and vice versa.

"Printing" is defined as depositing of a material, here a silicone composition, using a print head, nozzle, or another printer technology.

In this disclosure "3D or three dimensional article, object or part" means an article, object or part obtained by additive manufacturing or 3D printing as disclosed above.

In general, all 3D printing processes have a common starting point, which is a computer generated data source or program which may describe an object. The computer generated data source or program can be based on an actual or virtual object. For example, an actual object can be scanned using a 3D scanner and scan data can be used to make the computer generated data source or program. Alternatively, the computer generated data source or program may be designed from scratch.

The computer generated data source or program is typically converted into a standard tessellation language (STL) file format; however other file formats can also or additionally be used. The file is generally read into 3D printing software, which takes the file and optionally user input to separate it into hundreds, thousands, or even millions of "slices." The 3D printing software typically outputs machine instructions, which may be in the form of G-code, which is read by the 3D printer to build each slice. The machine instructions are transferred to the 3D printer, which then builds the object, layer by layer, based on this slice information in the form of machine instructions. Thicknesses of these slices may vary.

An extrusion 3D printer is a 3D printer where the material is extruded through a nozzle, syringue or orifice during the additive manufacturing process. Material extrusion generally works by extruding material through a nozzle, syringe or orifice to print one cross-section of an object, which may be repeated for each subsequent layer. The extruded material bonds to the layer below it during cure of the material.

In one preferred embodiment, the method for additive manufacturing a three-dimensional silicone elastomer article uses an extrusion 3D printer. Silicone compositions are extruded through a nozzle. The nozzle may be heated to aid in dispensing the addition crosslinking silicone composition The average diameter of the nozzle defines the thickness of the layer. In an embodiment, the diameter of the layer is comprised from 50 to 2000 µm, preferably from 100 to 800 µm and most preferably from 100 to 500 µm.

The distance between the nozzle and the substrate is an important parameter to assure good shape. Preferably it is comprised from 70 to 130%, more preferably from 80 to 120% of the nozzle average diameter.

The addition-crosslinking silicone composition to be dispensed through the nozzle may be supplied from a cartridge-like system. The cartridge may include a nozzle or nozzles with an associated fluid reservoir or fluids reservoirs. It is also possible to use a coaxial two cartridges system with a static mixer and only one nozzle. Pressure will be adapted to the fluid to be dispensed, the associated nozzle average diameter and the printing speed.

Because of the high shear rate occurring during the nozzle extrusion, the viscosity of the addition-crosslinking silicone compositions is greatly lowered and so permits the printing of fine layers.

Cartridge pressure could vary from 1 to 20 bars, preferably from 2 to 10 bar and most preferably from 4 to 8 bar. When nozzle diameters lower than 100 μm are used, cartridge pressure shall be higher than 20 bars to get good material extrusion. An adapted equipment using aluminum cartridges shall be used to resist such a pressure.

The nozzle and/or build platform moves in the X-Y (horizontal plane) to complete the cross section of the object, before moving in the Z axis (vertical) plane once one layer is complete. The nozzle has a high XYZ movement precision around 10 μm. After each layer is printed in the X, Y work plane, the nozzle is displaced in the Z direction only far enough that the next layer can be applied in the X, Y work place. In this way, the object which becomes the 3D article is built one layer at a time from the bottom upwards.

As disclosed before, the distance between the nozzle and the previous layer is an important parameter to assure good shape. Preferably, it should be comprised from 70 to 130%, preferably from 80 to 120% of the nozzle average diameter.

Advantageously, printing speed is comprised between 1 and 50 mm/s, preferably between 5 and 30 mm/s to obtain the best compromise between good accuracy and manufacture speed.

"Material jetting" is defined as "an additive manufacturing process in which droplets of build material are selectively deposited." The material is applied with the aid of a printing head in the form of individual droplets, discontinuously, at the desired location of the work plane (Jetting). 3D apparatus and a process for the step-by-step production of 3D structures with a printing head arrangement comprising at least one, preferably 2 to 200 printing head nozzles, allowing the site-selective application where appropriate of a plurality of materials. The application of the materials by means of inkjet printing imposes specific requirements on the viscosity of the materials.

In a material 3D jetting printer one or a plurality of reservoirs are subject to pressure and being connected via a metering line to a metering nozzle. Upstream or downstream of the reservoir there may be devices which make it possible for multicomponent addition-crosslinking silicone compositions to be homogeneously mixed and/or to evacuate dissolved gases. One or a plurality of jetting apparatuses operating independently of one another may be present, to construct the elastomer article from different addition-crosslinking silicone compositions, or, in the case of more complex structures, to permit composite parts made from silicone elastomers and other plastics, Because of the high shear rate occurring in the metering valve during the jetting metering procedure, the viscosity of such addition-crosslinking silicone compositions is greatly lowered and so permits the jetting metering of very fine microdroplets. After the microdrop has been deposited on the substrate, there is a sudden reduction in its shear rate, and so its viscosity climbs again. Because of this, the deposited drop rapidly becomes of high viscosity again and permits the shape-precise construction of three-dimensional structures.

The individual metering nozzles can be positioned accurately in x-, y-, and z-directions to permit precisely targeted deposition of the silicone rubber drops on the substrate or, in the subsequent course of formation of shaped parts, on the addition-crosslinking silicone rubber composition which has already been placed and which optionally has already been crosslinked.

Contrary to other additive manufacturing methods, the method does not need to be carried out in an irradiated or heated environment to initiate the curing after each layer is printed to avoid the collapse of the structure.

Typically, the 3D printer utilizes a dispenser, e.g. a nozzle or print head, for printing the particular curable silicone composition. Optionally, the dispenser may be heated before, during, and after dispensing the silicone composition. More than one dispenser may be utilized with each dispenser having independently selected properties.

In one embodiment, this method can use support material to build the object. If the object is printed using support material or rafts, after the printing process is complete, they are typically removed leaving behind the finished object.

Post-Process Options

Optionally, the resulting articles may be subjected to different post-processing regimes. In an embodiment, the method further comprises the step of heating the three-dimensional silicone article. Heating can be used to expedite cure. In another embodiment, the method further comprises the step of further irradiating the three-dimensional silicone article. Further irradiation can be used to expedite cure. In another embodiment, the method further comprises both steps of heating and irradiating the three-dimensional silicone article.

Optionally, post-processing steps can greatly improve the surface quality of the printed articles. Sanding is a common way to reduce or remove the visibly distinct layers of the model. Spraying or coating the surface of the elastomer article with a heat or UV curable RTV or LSR silicone composition can be used to get the right smooth surface aspect.

A surfacing treatment with a laser can also be done.

For medical applications, a sterilization of the final elastomer article can be obtained by heating the object at >100° C. or in an UV oven.

Addition Crosslinking Silicone Composition

The first and second addition-crosslinking silicone compositions may be the same as or different from one another, and when step 3) is repeated, independently selected addition-crosslinking silicone compositions may be utilized.

For purposes of brevity, the first and second addition-crosslinking silicone compositions, along with any other addition-crosslinking silicone compositions optionally utilized when step 3) is repeated, are referred to below collectively merely as "the addition-crosslinking silicone composition" or "the silicone compositions".

Organopolysiloxane A

According to a particularly advantageous mode, the organopolysiloxane A comprising, per molecule, at least two $C_2$-$C_6$ alkenyl radicals bonded to silicon atoms, comprises:
 (i) at least two siloxyl units (A.1), which may be identical or different, having the following formula:

$$W_a Z_b SiO_{\frac{4-(a+b)}{2}} \quad (A.1)$$

in which:
a=1 or 2, b=0, 1 or 2 and a+b=1, 2 or 3;
the symbols W, which may be identical or different, represent a linear or branched $C_2$-$C_6$ alkenyl group,
and the symbols Z, which may be identical or different, represent a monovalent hydrocarbon-based group containing from 1 to 30 carbon atoms, preferably chosen from the group formed by alkyl groups containing from 1 to 8 carbon atoms and aryl groups containing between 6 and 12 carbon atoms, and even more preferentially chosen from the group formed by methyl, ethyl, propyl, 3,3,3-trifluoropropyl, xylyl, tolyl and phenyl radicals,
(ii) and optionally at least one siloxyl unit having the following formula:

$$Z^1_a SiO_{\frac{4-a}{2}} \quad (A.2)$$

in which:
a=0, 1, 2 or 3,
the symbols $Z^1$, which may be identical or different, represent a monovalent hydrocarbon-based group containing from 1 to 30 carbon atoms, preferably chosen from the group formed by alkyl groups containing from 1 to 8 carbon atoms inclusive and aryl groups containing between 6 and 12 carbon atoms, and even more preferentially chosen from the group formed by methyl, ethyl, propyl, 3,3,3-trifluoropropyl, xylyl, tolyl and phenyl radicals.

Advantageously, Z and $Z^1$ are chosen from the group formed by methyl and phenyl radicals, and W is chosen from the following list: vinyl, propenyl, 3-butenyl, 5-hexenyl, 9-decenyl, 10-undecenyl, 5,9-decadienyl and 6-11-dodecadienyl, and preferably, W is a vinyl.

In a preferably embodiment, in formula (A.1) a=1 and a+b=2 or 3 and in formula (A.2) a=2 or 3.

These organopolysiloxanes A may have a linear, branched or cyclic structure. Their degree of polymerization is preferably between 2 and 5000.

When they are linear polymers, they are essentially formed from siloxyl units D chosen from the group formed by the siloxyl units $W_2SiO_{2/2}$, $WZSiO_{2/2}$ and $Z^1_2SiO_{2/2}$, and from siloxyl units M chosen from the group formed by the siloxyl units $W_3SiO_{1/2}$, $WZ_2SiO_{1/2}$, $W_2ZSiO_{1/2}$ and $Z^1_3SiO_{1/2}$. The symbols W, Z and $Z^1$ are as described above.

As examples of end units M, mention may be made of trimethylsiloxy, dimethylphenylsiloxy, dimethylvinylsiloxy or dimethylhexenylsiloxy groups.

As examples of units D, mention may be made of dimethylsiloxy, methylphenylsiloxy, methylvinylsiloxy, methylbutenylsiloxy, methylhexenylsiloxy, methyldecenylsiloxy or methyldecadienylsiloxy groups.

Said organopolysiloxanes A may be oils with a dynamic viscosity from about 10 to 1000000 mPa·s at 25° C., generally from about 1000 to 120000 mPa·s at 25° C.

Unless otherwise indicated, the viscosities under consideration in the present description correspond to a "Newtonian" dynamic viscosity magnitude at 25° C., i.e. the dynamic viscosity which is measured, in a manner that is known per se, with a Brookfield viscometer at a shear rate gradient that is low enough for the measured viscosity to be independent of the rate gradient.

When they are cyclic organopolysiloxanes, they are formed from siloxyl units D having the following formulae: $W_2SiO_{2/2}$, $Z_2SiO_{2/2}$ or $WZSiO_{2/2}$, which may be of the dialkylsiloxy, alkylarylsiloxy, alkylvinylsiloxy or alkylsiloxy type. Examples of such siloxyl units have already been mentioned above. Said cyclic organopolysiloxanes A have a viscosity from about 10 to 5000 mPa·s at 25° C.

Preferably, the organopolysiloxane compound A has a mass content of Si-vinyl units of between 0.001 and 30%, preferably between 0.01 and 10%.

Organohydrogenpolysiloxane B

According to a preferred embodiment, the organohydrogenopolysiloxane compound B is an organopolysiloxane containing at least two hydrogen atoms per molecule, bonded to an identical or different silicon atom, and preferably containing at least three hydrogen atoms per molecule directly bonded to an identical or different silicon atom.

Advantageously, the organohydrogenopolysiloxane compound B is an organopolysiloxane comprising:
(i) at least two siloxyl units and preferably at least three siloxyl units having the following formula:

$$H_d Z^3_e SiO_{\frac{4-(d+e)}{2}} \quad (B.1)$$

in which:
d=1 or 2, e=0, 1 or 2 and d+e=1, 2 or 3,
the symbols $Z^3$, which may be identical or different, represent a monovalent hydrocarbon-based group containing from 1 to 30 carbon atoms, preferably chosen from the group formed by alkyl groups containing from 1 to 8 carbon atoms and aryl groups containing between 6 and 12 carbon atoms, and even more preferentially chosen from the group formed by methyl, ethyl, propyl, 3,3,3-trifluoropropyl, xylyl, tolyl and phenyl radicals, and
(ii) optionally at least one siloxyl unit having the following formula:

$$Z^2_c SiO_{\frac{4-c}{2}} \quad (B.2)$$

in which:
c=0, 1, 2 or 3,
the symbols $Z^2$, which may be identical or different, represent a monovalent hydrocarbon-based group containing from 1 to 30 carbon atoms, preferably chosen from the group formed by alkyl groups containing from 1 to 8 carbon atoms and aryl groups containing between 6 and 12 carbon atoms, and even more preferentially chosen from the group formed by methyl, ethyl, propyl, 3,3,3-trifluoropropyl, xylyl, tolyl and phenyl radicals.

The organohydrogenopolysiloxane compound B may be formed solely from siloxyl units of formula (B.1) or may also comprise units of formula (B.2). It may have a linear, branched or cyclic structure. The degree of polymerization is preferably greater than or equal to 2. More generally, it is less than 5000.

Examples of siloxyl units of formula (B.1) are especially the following units: $H(CH_3)_2SiO_{1/2}$, $HCH_3SiO_{2/2}$, and $H(C_6H_5)SiO_{2/2}$.

When they are linear polymers, they are essentially formed from:
- siloxyl units D chosen from the units having the following formulae $Z^2_2SiO_{2/2}$ or $Z^3HSiO_{2/2}$, and
- siloxyl units M chosen from the units having the following formulae $Z^2_3SiO_{1/2}$ or $Z^3_2HSiO_{1/2}$, the symbols $Z^2$ and $Z^3$ are as described above.

These linear organopolysiloxanes may be oils with a dynamic viscosity from about 1 to 100000 mPa·s at 25° C., generally from about 10 to 5000 mPa·s at 25° C., or gums with a molecular mass of about 1000000 mPa·s or more at 25° C.

When they are cyclic organopolysiloxanes, they are formed from siloxyl units D having the following formulae $Z^2_2SiO_{2/2}$ and $Z^3HSiO_{2/2}$, which may be of the dialkylsiloxy or alkylarylsiloxy type or units $Z^3HSiO_{2/2}$ solely, the symbols $Z^2$ and $Z^3$ are as described above. They have a viscosity from about 1 to 5000 mPa·s.

Examples of linear organohydrogenopolysiloxane compounds B are: dimethylpolysiloxanes bearing hydrogenodimethylsilyl end groups, dimethylhydrogenomethylpolysiloxanes bearing trimethylsilyl end groups, dimethylhydrogenomethylpolysiloxanes bearing hydrogenodimethylsilyl end groups, hydrogenomethylpolysiloxanes bearing trimethylsilyl end groups, and cyclic hydrogenomethylpolysiloxanes.

The oligomers and polymers corresponding to the general formula (B.3) are especially preferred as organohydrogenopolysiloxane compound B:

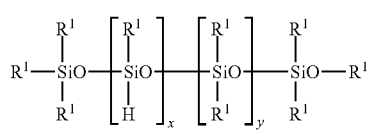

(B.3)

in which:
x and y are an integer ranging between 0 and 200,
the symbols $R^1$, which may be identical or different, represent, independently of each other:
- a linear or branched alkyl radical containing 1 to 8 carbon atoms, optionally substituted with at least one halogen, preferably fluorine, the alkyl radicals preferably being methyl, ethyl, propyl, octyl and 3,3,3-trifluoropropyl,
- a cycloalkyl radical containing between 5 and 8 cyclic carbon atoms,
- an aryl radical containing between 6 and 12 carbon atoms, or
- an aralkyl radical bearing an alkyl part containing between 5 and 14 carbon atoms and an aryl part containing between 6 and 12 carbon atoms.

The following compounds are particularly suitable for the invention as organohydrogenopolysiloxane compound B:

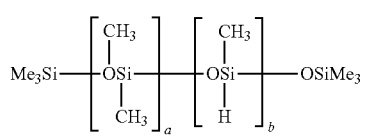

S1

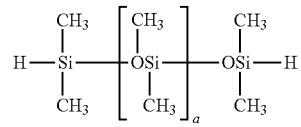

S2

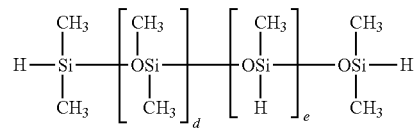

S3 with a, b, c, d and e defined below:
in the polymer of formula S1:
  $0 \leq a \leq 150$, preferably $0 \leq a \leq 100$, and more particularly $0 \leq a \leq 20$, and
  $1 \leq b \leq 90$, preferably $10 \leq b \leq 80$ and more particularly $30 \leq b \leq 70$,
in the polymer of formula S2: $0 \leq c \leq 15$
in the polymer of formula S3: $5 \leq d \leq 200$, preferably $20 \leq d \leq 100$, and $2 \leq e \leq 90$, preferably $10 \leq e \leq 70$.

In particular, an organohydrogenopolysiloxane compound B that is suitable for use in the invention is the compound of formula S1, in which a=0.

Preferably, the organohydrogenopolysiloxane compound B has a mass content of SiH units of between 0.2 and 91%, preferably between 0.2 and 50%.

In an embodiment, the organohydrogenopolysiloxane compound B is a branched polymer. Said branched organohydrogenopolysiloxane compound B comprises
a) at least two different siloxyl units selected from siloxyl unit M of formula $R_3SiO_{1/2}$, siloxyl unit D of formula $R_2SiO_{2/2}$, siloxyl unit T of formula $RSiO_{3/2}$ and siloxyl unit Q of formula $SiO_{4/2}$, in which R denotes monovalent hydrocarbon group with 1 to 20 carbon atoms or an hydrogen atom, and
b) provided that at least one of these siloxyl units is siloxyl unit T or Q and at least one of siloxyl units M, D or T contains a Si—H group.

Thus, according to one preferable embodiment, the branched organohydrogenopolysiloxane compound B can be selected from the following groups:
- organopolysiloxane resin of formula M'Q, which is essentially formed from:
  (a) monovalent siloxyl unit M' of formula $R_2HSiO_{1/2}$; and
  (b) tetravalent siloxyl unit Q of formula $SiO_{4/2}$; and
- organopolysiloxane resin of formula MD'Q, which is basically consisted of the following units:
  (a) divalent siloxyl unit D' of formula $RHSiO_{2/2}$;
  (b) monovalent siloxyl unit M of formula $R_3SiO_{1/2}$; and
  (c) tetravalent siloxyl unit Q of formula $SiO_{4/2}$;
wherein R represents monovalent hydrocarbyl having 1 to 20 carbon atoms, preferably represents monovalent aliphatic or aromatic hydrocarbyl having 1 to 12, more preferably 1 to 8 carbon atoms.

As a further embodiment, a mixture of at least a linear organohydrogenopolysiloxane compound B and at least a branched organohydrogenopolysiloxane compound B can be used. In this case, the linear and branched organohydrogenopolysiloxane compound B can be mixed in any proportion in a wide range, and the mixing proportion may be adjusted depending on the desired product properties such as hardness and the ratio of Si—H to alkenyl group.

In the context of the invention, the proportions of the organopolysiloxane A and of the organohydrogenopolysiloxane B are such that the mole ratio of the hydrogen atoms bonded to silicon (Si—H) in the organohydrogenopolysiloxane B to the alkenyl radicals bonded to silicon (Si—CH=CH$_2$) in the organopolysiloxane A is between 0.2 and 20, preferably between 0.5 and 15, more preferentially between 0.5 and 10 and even more preferentially between 0.5 and 5.

Catalyst C

Catalyst C consisting of at least one metal, or compound, from the platinum group are well known. The metals of the platinum group are those known under the name platinoids, this term combining, besides platinum, ruthenium, rhodium, palladium, osmium and iridium. Platinum and rhodium compounds are preferably used. Complexes of platinum and of an organic product described in patents U.S. Pat. Nos. 3,159,601, 3,159,602, 3,220,972 and European patents EPA 0 057 459, EPA 0 188 978 and EPA 0 190 530, and complexes of platinum and of vinylorganosiloxanes described in patents U.S. Pat. Nos. 3,419,593, 3,715,334, 3,377,432 and 3,814,730 may be used in particular. Specific examples are: platinum metal powder, chloroplatinic acid, a complex of chloroplatinic acid with β-diketone, a complex a chloroplatinic acid with olefin, a complex of a chloroplatinic acid with 1,3-divinyltetramethyldisiloxane, a complex of silicone resin powder that contains aforementioned catalysts, a rhodium compound, such as those expressed by formulae: RhCl(Ph$_3$P)$_3$, RhCl$_3$[S(C$_4$H$_9$)$_2$]$_3$, etc.; tetrakis(triphenyl)palladium, a mixture of palladium black and triphenylphosphine, etc.

The platinum catalyst ought preferably to be used in a catalytically sufficient amount, to allow sufficiently rapid crosslinking at room temperature. Typically, 1 to 200 ppm by weight of the catalyst are used, based in the amount of Pt metal, relative to the total silicone composition preferably 1 to 100 ppm by weight, more preferably 1 to 50 ppm by weight.

Reinforcing Silica Filler D

To allow a sufficiently high mechanical strength the addition-crosslinking silicone compositions comprise silica fine particles as reinforcing fillers D. Precipitated and fumed silicas and mixtures thereof can be used. The specific surface area of these actively reinforcing fillers ought to be at least 50 m$^2$/g and preferably in the range from 100 to 400 m$^2$/g as determined by the BET method. Actively reinforcing fillers of this kind are very well-known materials within the field of the silicone rubbers. The stated silica fillers may have hydrophilic character or may have been hydrophobized by known processes.

In a preferred embodiment, the silica reinforcing filler is fumed silica with a specific surface area of at least 50 m$^2$/g and preferably in the range from 100 to 400 m$^2$/g as determined by the BET method. Fumed silica may be used as is, in an untreated form, but is preferably subjected to hydrophobic surface treatment. In those cases, where a fumed silica that has undergone hydrophobic surface treatment is used, either a fumed silica that has been subjected to preliminary hydrophobic surface treatment may be used, or a surface treatment agent may be added during mixing of the fumed silica with the organopolysiloxane A, so that the fumed silica is treated in-situ.

The surface treatment agent may be selected from any of the conventionally used agents, such as alkylalkoxysilanes, alkylchlorosilanes, alkylsilazanes, silane coupling agents, titanate-based treatment agents, and fatty acid esters, and may use either a single treatment agent, or a combination of two or more treatment agents, which may be used either simultaneously or at different timings.

The amount of the silica reinforcing filler D in the addition-crosslinking silicone compositions is in the range from 5% to 40% by weight, preferably 10% to 35% by weight of the total composition. If this blend quantity is less than 5% by weight, then adequate elastomer strength may not be obtainable, whereas if the blend quantity exceeds 40% by weight, the actual blending process may become difficult.

Organopolysiloxane-Polyoxyalkylene Copolymer E

Organopolysiloxane-polyoxyalkylene copolymer E, also known as polydiorganosiloxane-polyether copolymers or polyalkylene oxide modified polyorganosiloxanes, are organopolysiloxanes containing siloxyl units which carry alkylene oxide chain sequences. Preferably, organopolysiloxane-polyoxyalkylene copolymer E are organopolysiloxanes containing siloxyl units which carry ethylene oxide chain sequences and/or propylene oxide chain sequences.

In a preferred embodiment the organopolysiloxane-polyoxyalkylene copolymer E is an organopolysiloxane containing siloxyl comprising units of the formula (E-1):

$$[R^1{}_a Z_b SiO_{(4-a-b)/2}]_n \quad (E\text{-}1)$$

in which
each $R^1$ is independently selected from hydrocarbon-based group containing from 1 to 30 carbon atoms, preferably chosen from the group formed by alkyl groups containing from 1 to 8 carbon atoms, alkenyl groups containing from 2 to 6 carbon atoms and aryl groups containing between 6 and 12 carbon atoms;
each Z is a group —$R^2$—$(OC_pH_{2p})_q(OC_rH_{2r})_s$—$OR^3$,
where
n is an integer greater than 2;
a and b are independently 0, 1, 2 or 3 and a+b=0, 1, 2 or 3,
$R^2$ is a divalent hydrocarbon group having from 2 to 20 carbon atoms or a direct bond;
$R^3$ is an hydrogen atom or a group as defined for $R^1$;
p and r are independently an integer from 1 to 6;
q and s are independently 0 or an integer such that 1<q+s<400;
and wherein each molecule of the organopolysiloxane-polyoxyalkylene copolymer E contains at least one group Z.

In a preferred embodiment, in the formula (E-1) above:
n is an integer greater than 2;
a and b are independently 0, 1, 2 or 3 and a+b=0, 1, 2 or 3,
$R^1$ is an alkyl group containing from 1 to 8 carbon atoms inclusive, and most preferably $R^1$ is a methyl group,
$R^2$ is a divalent hydrocarbon group having from 2 to 6 carbon atoms or a direct bond;
p=2 and r=3,
q is comprised between 1 and 40, most preferably between 5 and 30,
s is comprised between 1 and 40, most preferably between 5 and 30,
and $R^3$ is an hydrogen atom or an alkyl group containing from 1 to 8 carbon atoms inclusive, and most preferably $R^3$ is an hydrogen atom.

In a most preferred embodiment, the organopolysiloxane-polyoxyalkylene copolymer E is an organopolysiloxane containing a total number of siloxyl units (E-1) comprised 1 and 200, preferably between 50 and 150 and a total number of Z groups comprised between 2 and 25, preferably between 3 and 15.

An example of organopolysiloxane-polyoxyalkylene copolymer E that can be used in the method of the invention corresponds to the formula (E-2)

$$R^a{}_3SiO[R^a{}_2SiO]_t[R^aSi(R^b{-}(OCH_2CH_2)_x(OCH_2(CH_3)CH)_y{-}OH)O]_rSiR^a{}_3 \quad (E\text{-}2)$$

where
each $R^a$ is independently selected from alkyl groups containing from 1 to 8 carbon atoms and preferably $R^a$ is a methyl group,
each $R^b$ is a divalent hydrocarbon group having from 2 to 6 carbon atoms or a direct bond, and preferably $R^b$ is a propyl group,
x and y are independently integers comprised from 1 to 40, preferably from 5 and 30, and most preferably from 10 to 30,
t is comprised from 1 to 200, preferably from 25 to 150, and
r is comprised from 2 to 25, preferably from 3 to 15.

Advantageously, in an embodiment the organopolysiloxane-polyoxyalkylene copolymer E is:

$$Me_3SiO[Me_2SiO]_{75}[MeSi((CH_2)_3{-}(OCH_2CH_2)_{22}(OCH_2(CH_3)CH)_{22}{-}OH)O]_7SiMe_3.$$

In another embodiment, the organopolysiloxane-polyoxyalkylene copolymer E is a branched organopolysiloxane-polyxyalkylene copolymer comprising at least one T and/or one Q siloxy unit with Q corresponding to the siloxy unit $SiO_{2/2}$ and T corresponding to the siloxy unit $R^1SiO_{3/2}$ where $R^1$ is independently selected from hydrocarbon-based group containing from 1 to 30 carbon atoms, preferably chosen from the group formed by alkyl groups containing from 1 to 8 carbon atoms, alkenyl groups containing from 2 to 6 carbon atoms and aryl groups containing between 6 and 12 carbon atoms In another embodiment, the organopolysiloxane-polyoxyalkylene copolymer E can further comprise other functional groups chosen from the group consisting of: alkenyl groups having from 2 to 6 carbon atoms, hydroxide, hydrogen, (meth)acrylate groups, amino groups and hydrolysable groups as alkoxy, enoxy, acetoxy or oxime groups.

Methods of preparing polydiorganosiloxane-polyoxyalkylene copolymers are well known in the art. For example, a polydiorganosiloxane-polyoxyalkylene copolymer can be prepared using a hydrosilylation reaction by reacting, for example, a polydiorganosiloxane containing silicon-bonded hydrogen atoms with a polyoxyalkylene containing groups having aliphatic unsaturation in the presence of a platinum group catalyst.

In one embodiment, the amount of organopolysiloxane-polyoxyalkylene copolymer E in the addition-crosslinking silicone compositions is at least 0.3% weight, preferably at least 0.4% weight, most preferably in the range from 0.6% to 4% weight, and even most preferably from 0.6% to 3% weight with respect to the total weight of the silicone composition.

In another embodiment, the amount of organopolysiloxane-polyoxyalkylene copolymer E in the addition-crosslinking silicone compositions is at least 0.2% weight, preferably at least 0.25% weight, most preferably in the range from 0.25% to 3% weight, and even most preferably from 0.25% to 2% weight with respect to the total weight of the silicone composition Crosslinking Inhibitor F Crosslinking inhibitors are commonly used in addition crosslinking silicone compositions to slow the curing of the composition at ambient temperature. The crosslinking inhibitor F may be chosen from the following compounds:

acetylenic alcohols.
organopolysiloxanes substituted with at least one alkenyl that may optionally be in cyclic form, tetramethylvinyltetrasiloxane being particularly preferred,
pyridine,
organic phosphines and phosphites,
unsaturated amides, and
alkyl maleates.

These acetylenic alcohols (Cf. FR-B-1 528 464 and FR-A-2 372 874), which are among the preferred hydrosilylation-reaction thermal blockers, have the formula:

$$(R')(R'')(OH)C{-}C{\equiv}CH$$

in which: R' is a linear or branched alkyl radical, or a phenyl radical; and —R" is H or a linear or branched alkyl radical, or a phenyl radical; the radicals R' and R" and the carbon atom α to the triple bond possibly forming a ring.

The total number of carbon atoms contained in R' and R" being at least 5 and preferably from 9 to 20. For the said acetylenic alcohols, examples that may be mentioned include:
1-ethynyl-1-cyclohexanol;
3-methyl-1-dodecyn-3-ol;
3,7,11-trimethyl-1-dodecyn-3-ol;
1,1-diphenyl-2-propyn-1-ol;
3-ethyl-6-ethyl-1-nonyn-3-ol;
2-methyl-3-butyn-2-ol;
3-methyl-1-pentadecyn-3-ol; and
diallyl maleate or diallyl maleate derivatives.

In a preferred embodiment, the crosslinking inhibitor is 1-ethynyl-1-cyclohexanol To obtain a longer working time or "pot life", the quantity of the inhibitor is adjusted to reach the desired "pot life". The concentration of the catalyst inhibitor in the present silicone composition is sufficient to slow curing of the composition at ambient temperature. This concentration will vary widely depending on the particular inhibitor used, the nature and concentration of the hydrosilylation catalyst, and the nature of the organohydrogenpolysiloxane. Inhibitor concentrations as low as one mole of inhibitor per mole of platinum group metal will in some instances yield a satisfactory storage stability and cure rate. In other instances, inhibitor concentrations of up to 500 or more moles of inhibitor per mole of platinum group metal may be required. The optimum concentration for a inhibitor in a given silicone composition can be readily determined by routine experimentation.

Advantageously, the amount of the crosslinking inhibitor F in the addition-crosslinking silicone compositions is in the range from 0.01% to 0.2% weight, preferably from 0.03% to 0.15% weight with respect to the total weight of the silicone composition.

The use of the inhibitor is effective to avoid the premature curing of the silicone composition on the tip of the nozzle and subsequent disfiguration of the printed layer.

Other Components:

The silicone compositions according to the invention may also comprise other fillers like a standard semi-reinforcing or packing filler, hydroxyl functional silicone resins, pigments, or adhesion promoters.

Non siliceous minerals that may be included as semi-reinforcing or packing mineral fillers can be chosen from the group constituted of: carbon black, titanium dioxide, aluminium oxide, hydrated alumina, calcium carbonate, ground quartz, diatomaceous earth, zinc oxide, mica, talc, iron oxide, barium sulfate and slaked lime.

Silicone resin denotes an organopolysiloxane comprising at least one T and/or one Q siloxy unit with Q: $SiO_{2/2}$ and T: $R1SiO_{3/2}$. The hydroxyl functional silicone resin are well known and can be chosen from MQ(OH), MDT(OH), or DT(OH) resins with M: $R^1R^2R^3SiO_{1/2}$, D: $R^1R^2SiO_{2/2}$, Q(OH): $(OH)SiO_{3/2}$, and T(OH): $(OH)R^1SiO_{2/2}$, the $R^1$, $R^2$ and $R^3$ groups being chosen independently of one another from:
- linear or branched alkyl groups having from 1 to 8 carbon atoms inclusive, optionally substituted by one or more halogen atoms; and
- aryl or alkylaryl groups containing from 6 to 14 carbon atoms inclusive.

Preferably, the hydroxyl functional silicone resin is a MQ(OH) resin.

In a preferably embodiment, the silicone composition of the invention comprise, per 100% weight of the silicone composition:
- from 55 to 80% weight of at least one organopolysiloxane compound A,
- from 0.1 to 4% weight of at least one organohydrogenopolysiloxane compound B,
- from 5 to 40% weight of at least one reinforcing silica filler D,
- from 0.3 to 4% weight of at least one organopolysiloxane-polyoxyalkylene copolymer E,
- from 0.002 to 0.01% weight of platinum and
- from 0.01 to 0.2% weight of at least one crosslinking inhibitor F.

In another preferably embodiment, the silicone composition of the invention comprise, per 100% weight of the silicone composition:
- from 55 to 80% weight of at least one organopolysiloxane compound A,
- from 0.1 to 4% weight of at least one organohydrogenopolysiloxane compound B,
- from 5 to 40% weight of at least one reinforcing silica filler D,
- from 0.6 to 3% weight of at least one organopolysiloxane-polyoxyalkylene copolymer E,
- from 0,0002 to 0.01% weight of platinum and
- from 0.01 to 0.2% weight of at least one crosslinking inhibitor F.

In another preferably embodiment, the silicone composition of the invention comprise, per 100% weight of the silicone composition:
- from 55 to 80% weight of at least one organopolysiloxane compound A,
- from 0.1 to 4% weight of at least one organohydrogenopolysiloxane compound B,
- from 5 to 40% weight of at least one reinforcing silica filler D,
- from 0.25 to 3% weight of at least one organopolysiloxane-polyoxyalkylene copolymer E,
- from 0,0002 to 0.01% weight of platinum and
- from 0.01 to 0.2% weight of at least one crosslinking inhibitor F.

In another preferably embodiment, the silicone composition of the invention comprise, per 100% weight of the silicone composition:
- from 55 to 80% weight of at least one organopolysiloxane compound A,
- from 0.1 to 4% weight of at least one organohydrogenopolysiloxane compound B,
- from 5 to 40% weight of at least one reinforcing silica filler D,
- from 0.25 to 2% weight of at least one organopolysiloxane-polyoxyalkylene copolymer E,
- from 0,0002 to 0.01% weight of platinum and
- from 0.01 to 0.2% weight of at least one crosslinking inhibitor F.

Composition Properties

In this method, the silicone compositions crosslinkable through addition reactions show the adequate rheological properties necessary to avoid collapse or deformation of the objects at room temperature before complete curing.

Preferably, the silicone compositions with a "viscosity ratio", defined as the ratio of the dynamic viscosity at low ($0.5$ $s^{-1}$) and high shear rate ($25$ $s^{-1}$), higher than 30 and preferably higher than 35 are used to manufacture an article by additive manufacturing with a high quality.

In a preferred embodiment, the silicone compositions crosslinkable through addition reactions have a dynamic viscosity at low ($0.5$ $s^{-1}$) shear rate of at least 40 Pa. and preferably of at least 50 Pa·s.

The crosslinking of the silicone composition starts, even if slowly, as soon as the layer is printed. To avoid collapse or deformation of the objects at room temperature before complete curing, rheological properties and curing speed are managed together.

Multi-Part Composition

The composition can be a one-part composition comprising components A to E in a single part or, alternatively, a multi-part composition comprising these components in two or more parts, provided components B, and C are not present in the same part. For example, a multi-part composition can comprise a first part containing a portion of component A and all of component C, and a second part containing the remaining portion of component A and all of component B. In certain embodiments, component A is in a first part, component B is in a second part separate from the first part, and component C is in the first part, in the second part, and/or in a third part separate from the first and second parts. Components D, E and F may be present in a respective part (or parts) along with at least one of components B, or C, and/or can be in a separate part (or parts).

The one-part composition is typically prepared by combining the principal components and any optional ingredients in the stated proportions at ambient temperature. Although the order of addition of the various components is not critical if the composition is to be used immediately, the hydrosilylation catalyst is typically added last at a temperature below about 30° C. to prevent premature curing of the composition.

Also, the multi-part composition can be prepared by combining the components in each part. Combining can be accomplished by any of the techniques understood in the art such as, blending or stirring, either in a batch or continuous process in a particular device. The particular device is determined by the viscosity of the components and the viscosity of the final composition.

In certain embodiments, when the silicone compositions are multipart silicone compositions, the separate parts of the multi-part silicone composition may be mixed in a dispense printing nozzle, e.g. a dual dispense printing nozzle, prior to and/or during printing. Alternatively, the separate parts may be combined immediately prior to printing.

Another aspect of the present invention is a silicone elastomer article produced by the method described according to the present invention.

Another aspect of the present in invention is the use of silicone compositions as described above with a 3D printer, preferably selected from an extrusion 3D printer or a material jetting 3D printer.

Another aspect of the present in invention is the use of silicone compositions crosslinkable through addition reactions as described above with a 3D printer, preferably selected from an extrusion 3D printer or a material jetting 3D printer, to manufacture a silicone elastomer article.

The following examples are intended to illustrate and not to limit the invention.

EXAMPLES

Addition-crosslinking silicone compositions are prepared and printed using an extrusion 3D printer according with disclosure.

Raw Materials
LSR Composition 1
A mixer is loaded with:
29 parts dimethylpolysiloxane oil blocked at both ends by $Me_2ViSiO_{1/2}$ units, having a viscosity of 60000 mPa·s
29 parts of a dimethylpolysiloxane blocked at both ends by $Me_2ViSiO_{1/2}$ units, having a viscosity of 100000 mPa·s
26 parts of silica fumed with a specific surface area measured by the BET method of 300 m²/g and 7 parts of hexamethyldisilazane.

The whole is heated at 70° C. under agitation for 1 hour and then devolatilised, cooled and stored as Base 1 of the composition 1

To 45 parts of this Base 1 is then added in a speed mixer:
Platinum metal which is introduced in the form of an organometallic complex at 10% by weight of Platinum metal, known as Karstedt's catalyst diluted in a vinyl oil.
3 parts: dimethylpolysiloxane oil having vinyl groups in the chain and at the chain ends and having a viscosity of 1000 mPa·s
2 parts of a dimethylpolysiloxane oil having vinyl groups in the chain and at the chain ends and having a viscosity of 400 mPa·s The composition called LSR composition 1 part A is mixed during one minute at 1000 rounds per minute in the speed mixer. The Pt content is 5 ppm To 45 parts of this Base 1 is then added in a speed mixer:
1.3 parts of an organohydrogenopolysiloxane M'Q resin comprising Si—H groups
0.5 parts of a linear organohydrogenopolysiloxane comprising Si— H groups in the chain and at chain ends and containing approximately 20% by weight of groups Si— H
1.5 parts of a dimethylpolysiloxane oil having vinyl groups in the chain and at the chain ends and having a viscosity of 400 mPa·s
1.6 parts: dimethylpolysiloxane oil having vinyl groups in the chain and at the chain ends and having a viscosity of 1000 mPa·s
0.08 parts of ethynyl-1-cyclohexanol-1 as crosslinking inhibitor.

The composition called LSR composition 1 part B is mixed during one minute at 1000 rounds per/minute in the speed mixer Addition-crosslinking compositions used in the examples are prepared by mixing the LSR composition 1 parts A & B in a ratio 1:1 already comprising silica as thixotropic agent with different components listed below that improve the threshold effect.

PEG 400 is poly(ethylene glycol) monolaurate, CAS Number 9004-81-3 purchased from Sigma Aldrich.

Bluesil SP 3300® obtained Bluestar Silicones, CAS Number 68937-55-3 corresponds to $Me_3SiO[Me_2SiO]_{75}[MeSi((CH_2)_3$—$(OCH_2CH_2)_{22}(OCH_2CH_2CH_2)_{22}$—$OH)O]_7SiMe_3$.

Silsurf® Q20308 purchased from Siltech Corporation, polyether MQ resin where some of the methyl groups are replaced with polyalkyleneoxide chains, viscosity at 25° C. 800 mPa·s.

Silsurf® Q25315-O purchased from Siltech Corporation, polyether MQ resin where some of the methyl groups are replaced with polyalkyleneoxide chains, viscosity at 25° C. 500 mPa·s.

LSR composition 1 part A with different amounts of the above components have been evaluated in rheological tests

TABLE 1

| | Tested compositions (weight %) | | | | |
|---|---|---|---|---|---|
| Sample | LSR Part A— Composition 1 | PEG 400 | SP 3300 | Q20308 | Q25315 |
| Part A— Composition 1 | 100 | 0 | 0 | 0 | 0 |
| PEG-05 | 99.5 | 0.5 | 0 | 0 | 0 |
| PEG-1 | 99 | 1 | 0 | 0 | 0 |
| PEG-2 | 98 | 2 | 0 | 0 | 0 |
| SP-05 | 99.5 | 0 | 0.5 | 0 | 0 |
| SP-1 | 99 | 0 | 1 | 0 | 0 |
| SP-2 | 98 | 0 | 2 | 0 | 0 |
| Q20-05 | 99.5 | 0 | 0 | 0.5 | 0 |
| Q20-1 | 99 | 0 | 0 | 1 | 0 |
| Q20-2 | 98 | 0 | 0 | 2 | 0 |
| Q25-05 | 99.5 | 0 | 0 | 0 | 0.5 |
| Q25-1 | 99 | 0 | 0 | 0 | 1 |
| Q25-15 | 98.5 | 0 | 0 | 0 | 1.5 |

Rheological Test Descriptions
Viscosity Ratio and Tan(Delta) Ratio

A rotational rheometer (DHR-2—TA INSTRUMENTS) was used to define the rheological behavior of samples. An equivalent shear thinning test was performed using cone-plate (25 mm, 2°, gap=51 μm) to define a "viscosity ratio" which allows users to evaluate the material's performance in 3D printing. The "ratio" is computed with the dynamic viscosity at low and high shear rate: 0.5 and 25 s$^{-1}$ respectively. The time required to get the measure is 60 s at different shear rate. A high value of "viscosity ratio" means that material is able to product 3D objects with high quality (Table 2).

The thixotropic behavior is also determined by the tan (delta) ratio corresponding to G"/G', (where G" and G' are the loss and storage moduli respectively) for each sample at several structural times (10, 100 and 1000 s) (Table 3).

TABLE 2

| | Viscosity Ratio | | |
|---|---|---|---|
| Sample | η (Pa · s) at [0.5 s$^{-1}$] | η (Pa · s) at [25 s$^{-1}$] | Ratio |
| Part A— Composition1 | 1302 | 48 | 27 |
| PEG-05 | 3752 | 117 | 32 |
| PEG-1 | 3953 | 119 | 33 |
| PEG-2 | 3826 | 93 | 41 |

TABLE 2-continued

Viscosity Ratio

| Sample | η (Pa · s) at [0.5 s⁻¹] | η (Pa · s) at [25 s⁻¹] | Ratio |
|---|---|---|---|
| SP-05 | 4223 | 108 | 39 |
| SP-1 | 6592 | 143 | 46 |
| SP-2 | 7443 | 117 | 63 |

The results of Table 2 show the shear thinning ability of samples through the viscosity value. We observe that the SP-1 and SP-2 mixtures have a higher viscosity ratio (>45) compared to other mixtures (<45). This allow users to print high viscous mixtures despite elastic part increasing.

TABLE 3

Thixotropic behavior—Tan(delta) at 10, 100 and 1000s (1 radiant/s)

| | G"/G' Tan(delta) at 10 s | G"/G' Tan(delta) at 100 s | G"/G' Tan(delta) at 1000 s |
|---|---|---|---|
| Part A Composition1 | 1.96 | 1.44 | 0.75 |
| PEG-05 | 0.88 | 0.45 | 0.25 |
| PEG-1 | 0.86 | 0.42 | 0.23 |
| PEG-2 | 0.86 | 0.43 | 0.24 |
| SP-05 | 0.86 | 0.48 | 0.27 |
| SP-1 | 0.74 | 0.37 | 0.21 |
| SP-2 | 0.67 | 0.32 | 0.19 |

We observe that the SP-1 and SP-2 formulations are extraordinarily elastic (low tan(delta)) compared with PEG-05, PEG-1 and PEG-2 formulations. The SP-05 sample shows the same rheological behavior that formulations with PEG (PEG-05, PEG-1 and PEG-2). These observations are especially true for 10 and 100 s. It allows users to print at high speed with a good bearing of 3D object.

Yield Stress, Restructuring Time and G' at Rest.

Yield Stress:

The yield stress in 3D printing will characterize the ability of the material to keep a constant shape under the pressure of the successive layer of material. On a rheometer ARES G2 from TA with a conic upper geometry (25 mm, 0.1002 rad, stainless steel) and a plan lower geometry (25 mm, stainless steel), a stress growth procedure is applied in transient mode. A constant shear rate of 0.1 s⁻¹ is imposed for 60 seconds, the stress will growth constantly with the time. To avoid histological interactions a soak time of 300 s is performed. The sampling rate is 50 points/s. The yield stress value finally associated with a formulation is the maximum stress value measured.

Restructuring Time:

During the extrusion through the syringe during printing, the material is destructured (the yield stress is overpassed). The material becomes fluid and after a characteristic time at rest (on the plate) the material recovers its previous state. That's the thixotropic effect. This characteristic time is called the restructuring time. On a rheometer ARES G2 from TA with a conic upper geometry (25 mm, 0.1002 rad, stainless steel) and a plan lower geometry (25 mm, stainless steel). First the sample is pre-sheared in "conditioning sample" mode with a constant shear rate of 3 s⁻¹ for 10 s. Secondly in dynamic mode, an oscillation time measure of the storage modulus (G') is conducted for 700 sat a 0.1% strain (value acquired with a linear range measure) at a 1 rad/s frequency. The value associated with the formulation is the time of the cross point of the tangent from the first points line (5 first seconds) and the tangent from the last points line (100 last seconds) on the G' curve.

G' at Rest:

This value characterizes the state of the material at rest and its processability. With the same methods as in restructuring time" the value at rest of G' at 700 s is taken.

TABLE 4

Results

| Sample | Yield Stress (Pa) | Restructuring time (s) | G' at rest (kPa) |
|---|---|---|---|
| Part A—Composition 1 | 525 | 210 | 18 |
| PEG-05 | 1627 | 50 | 180 |
| PEG-1 | 1697 | 48 | 182 |
| PEG-2 | 1482 | 45 | 152 |
| SP-05 | 2596 | 61 | 300 |
| SP-1 | 3112 | 59 | 352 |
| SP-2 | 2836 | 58 | 370 |
| Q20-05 | 948 | 80 | 52 |
| Q20-1 | 2110 | 72 | 255 |
| Q20-2 | 3207 | 62 | 282 |
| Q25-05 | 1910 | 61 | 232 |
| Q25-1 | 2156 | 57 | 306 |
| Q25-15 | 2090 | 57 | 306 |

3D Printing Tests

A homemade 3D printer, build from FDM (Fused deposition Modelling) type, was used to product 3D objects using fluid materials (from low to high Newtonian viscosity). The 3D printer has a high XYZ movement precision (10 μm). The 3D printer was controlled by computer using open-source "Repetier" and "slic3r" software. A pneumatic dispenser (ULTIMUS V-NORDSON EFD) was used to control the addition-crosslinking silicone composition deposition.

Fluid deposition is performed with simple (or coaxial) cartridge(s) connected to a nozzle (and static mixer for coaxial cartridges) (NORDSON EFD).

The average nozzle diameter used, equal to the thickness of the layer, is 400 μm.

The pressure used is 5.5 bars for the base composition, 6 bars for the PEG-05, PEG-1, PEG-2 and SP-05 compositions and 6.5 bars for SP-1 and SP-2 compositions.

A single layer has the following dimensions (50 mm; 400 μm; 400 μm). The distance between the nozzle and the building plate or the previous layer is comprised from 350 to 450 μm. The printing speed is adjusted to 10 mm/s. A 10 s stop is done between each layer printing.

No heat or radiation is applied.

We have measured the maximum number of layers that can be printed without distorsion or collapse of the structure using the LSR composition 1 prepared by mixing the LSR composition 1 parts A & B in a ratio 1:1 where different amounts of PEG 400 or organopolysiloxane-polyoxyalkylene copolymers (SP3300 or Q20308) have been added.

TABLE 5

3D printing observation—Maximum layers printed with 400 μm each layer

| Sample | Layers with 10 s stop |
|---|---|
| LSR Composition 1 | 15 |
| LSR Composition 1 with 0.25% weight PEG400 | 20 |
| LSR Composition 1 with 0.5% weight PEG400 | 19 |

TABLE 5-continued 3D printing observation—Maximum layers printed with 400 μm each layer

| Sample | Layers with 10 s stop |
|---|---|
| LSR Composition 1 with 1% weight PEG400 | 22 |
| LSR Composition 1 with 0.25% SP3300 | 25 |
| LSR Composition 1 with 0.5% weight SP3300 | 28 |
| LSR Composition 1 with 1% weight SP3300 | 34 |
| LSR Composition 1 with 0.5% weight Q20308 | 26 |

When 0.5% weight of SP 3300 or Q20308 is added to the LSR composition 28 or 26 layers can be printed without distorsion or collapse of the structure compared to 15 where the LSR composition is used. PEG 400 is less effective, only 19 layers can be printed.

Curing of Printed Dumbbell Shaped Specimen

Dumbbell specimen have been printed with the same printer and operations than disclosed before and allowed to crosslink for 72 hours at ambient temperature.

Mechanical Characterization:Tensile Test Description on Dumbbell Specimen

A tensile testing machine (AGS-X SHIMADZU) with 10 kN cell, pneumatic flat grips (5 bars) and mechanical extensometer, was used to define mechanicals properties of samples. Tests according to ASTM test (D412) were performed on printed dumbbell shaped specimen (thickness≈2 mm) for each formulation to determine the Young Modulus E, the elongation at break and the stress at break. Results are presented on table 6.

TABLE 6

Mechanical behavior—General description

| Sample | E (MPa) | Elongation at break (%) | Stress at break (MPa) |
|---|---|---|---|
| LSR Composition 1 | 2.0 | 697 | 42.3 |
| LSR Composition 1 with PEG-0.25% weight | 2.3 | 771 | 57.2 |
| LSR Composition 1 with PEG-0.5% weight | 2.2 | 759 | 49.2 |
| LSR Composition 1 with PEG-1% weight | 1.9 | 814 | 51.1 |
| LSR Composition 1 with SP-0.25% | 2.3 | 645 | 37.4 |
| LSR Composition 1 with SP-0.5% weight | 2.8 | 644 | 45.7 |
| LSR Composition 1 with SP-1% weight | 2.2 | 681 | 36.8 |

The results of table 6 show the mechanicals properties for each composition. The Young's modulus, elongation at rupture and stress at rupture are not different compared to the silicone base. This very good results allow users to print 3D objects which will get the same mechanical properties as objects products by molding.

The invention claimed is:

1. A method for additive manufacturing a silicone elastomer article comprising:
printing a first silicone composition on a substrate with an extrusion 3D printer to form a first layer;
printing a second silicone composition on the first layer or a previous layer with the extrusion 3D printer to form a subsequent layer; and
allowing the first, previous, and subsequent layers to crosslink to obtain the silicone elastomer article,
wherein the first and second silicone compositions are crosslinkable through addition reactions,
wherein the first and second silicone compositions each have a viscosity ratio greater than 45, the viscosity ratio being a ratio of the dynamic viscosity of a silicone composition at a low shear rate of 0.5 s$^{-1}$ and at a high shear rate of 25 s$^{-1}$, and
wherein the first and second silicone compositions each comprise:
at least one organopolysiloxane compound A comprising, per molecule, at least two $C_2$-$C_6$ alkenyl radicals bonded to silicon atoms,
at least one organohydrogenopolysiloxane compound B comprising, per molecule, at least two hydrogen atoms bonded to an identical or different silicon atom,
at least one catalyst C consisting of at least one metal or compound from the platinum group,
at least one reinforcing silica filler D,
at least one organopolysiloxane-polyoxyalkylene copolymer E, wherein the at least one organopolysiloxane-polyoxyalkylene copolymer E comprises (E-1):

$$[R^1_a Z_b SiO_{(4-a-b)/2}]_n \qquad (E\text{-}1)$$ 

in which
each $R^1$ is independently selected from a hydrocarbon-based group containing from 1 to 30 carbon atoms,
each Z is a group —$R^2$—$(OC_pH_{2p})_q(OC_rH_{2r})_s$—$OR^3$, wherein:
n is an integer greater than 2,
a and b are independently 0, 1, 2 or 3 and a+b=0, 1, 2, or 3,
$R^2$ is a divalent hydrocarbon group having from 2 to 20 carbon atoms or a direct bond,
$R^3$ is a hydrogen atom or a group as defined for $R^1$,
p and r are independently an integer from 1 to 6,
q and s are independently 0 or an integer such that 1<q+s<400, and
each molecule of the organopolysiloxane-polyoxyalkylene copolymer E contains at least one group Z, and
at least one crosslinking inhibitor F.

2. The method according to claim 1, wherein the first and second silicone compositions each comprise at least 0.3% by weight of the at least one organopolysiloxane-polyoxyalkylene copolymer E with respect to a total weight of the respective first and second silicone compositions.

3. The method according to claim 1, wherein the first and second silicone compositions each comprise from 0.6% to 4% by weight of the at least one organopolysiloxane-polyoxyalkylene copolymer E with respect to a total weight of the respective first and second silicone compositions.

4. The method according to claim 1, wherein the first and second silicone compositions each further comprise one or more hydroxyl functional silicone resins.

5. The method according to claim 1, wherein at least one of the first and second silicone compositions comprises per 100% by weight of a total weight of the at least one of the first and second silicone compositions:

from 55 to 80% by weight of the at least one organopolysiloxane compound A, from 0.1 to 4% by weight of the at least one organohydrogenopolysiloxane compound B, from 5 to 40% by weight of the at least one reinforcing silica filler D, from 0.3 to 4% by weight of the at least one organopolysiloxane-polyoxyalkylene copolymer E, from 0.0002 to 0.01% by weight of platinum, and from 0.01 to 0.2% by weight of the at least one crosslinking inhibitor F.

6. The method according to claim 1, wherein in the extrusion 3D printer the first and second silicone compositions are extruded through a nozzle with an average diameter from 50 to 2000 μm.

7. The method according to claim 6, wherein, during the printings, a distance between the nozzle and the substrate or the previous layer is from 70 to 130% of the nozzle average diameter.

8. The method according to claim 1, wherein no heat or radiation is applied during or between the printing of the first and second silicone compositions prior to the printing of at least 10 layers.

9. The method according to claim 1, wherein in the formula (E-1):
n is an integer greater than 2,
a and b are independently 0, 1, 2, or 3, and a+b=0, 1, 2 or 3,
$R^1$ is an alkyl group containing from 1 to 8 carbon atoms inclusive,
$R^2$ is a divalent hydrocarbon group having from 2 to 6 carbon atoms or a direct bond,
p=2 and r=3,
q is between 1 and 40,
s is between 1 and 40, and
$R^3$ is a hydrogen atom or an alkyl group containing from 1 to 8 carbon atoms inclusive.

10. The method according to claim 1, wherein the organopolysiloxane-polyoxyalkylene copolymer E is an organopolysiloxane containing a total number of siloxyl units (E-1) between 1 and 200.

11. The method according to claim 1, wherein the organopolysiloxane-polyoxyalkylene copolymer E is an organopolysiloxane containing a total number of siloxyl units (E-1) between 50 and 150.

12. The method according to claim 1, wherein a total number of Z groups is between 2 and 25.

13. A method for additive manufacturing a silicone elastomer article comprising:
printing a first silicone composition on a substrate with an extrusion 3D printer to form a first layer;
printing a second silicone composition on the first layer or a previous layer with the extrusion 3D printer to form a subsequent layer; and
allowing the first, previous, and subsequent layers to crosslink to obtain the silicone elastomer article,
wherein the first and second silicone compositions are crosslinkable through addition reactions,
wherein the first and second silicone compositions each have a viscosity ratio greater than 45, the viscosity ratio being a ratio of the dynamic viscosity of a silicone composition at a low shear rate of 0.5 s$^{-1}$ and at a high shear rate of 25 s$^{-1}$, and
wherein the first and second silicone compositions each comprise:

at least one organopolysiloxane compound A comprising, per molecule, at least two $C_2$-$C_6$ alkenyl radicals bonded to silicon atoms, at least one organohydrogenopolysiloxane compound B comprising, per molecule, at least two hydrogen atoms bonded to an identical or different silicon atom, at least one catalyst C consisting of at least one metal or compound from the platinum group, at least one reinforcing silica filler D, at least one organopolysiloxane-polyoxyalkylene copolymer E, wherein the at least one organopolysiloxane-polyoxyalkylene copolymer E comprising (E-2):

$$R^a{}_3SiO[R^a{}_2SiO]_t[R^aSi(R^b-(OCH_2CH_2)_x(OCH_2(CH_3)CH)_y-OH)O]_rSiR^a{}_3 \quad (E-2)$$

in which
each $R^a$ is independently selected from alkyl groups containing from 1 to 8 carbon atoms,
each $R^b$ is a divalent hydrocarbon group having from 2 to 6 carbon atoms or a direct bond,
x and y are independently integers comprised from 1 to 40,
t is from 1 to 200, and
r is from 2 to 25, and
at least one crosslinking inhibitor F.

14. The method according to claim 13, wherein the organopolysiloxane-polyoxyalkylene copolymer E is:

$$Me_3SiO[Me_2SiO]_{75}[MeSi(CH_2)_3-(OCH_2CH_2)_{22}(OCH_2(CH_3)CH)_{22}-OH)O]_7SiMe_3.$$

15. A method for additive manufacturing a silicone elastomer article comprising:
printing a first silicone composition on a substrate with an extrusion 3D printer to form a first layer;
printing a second silicone composition on the first layer or a previous layer with the extrusion 3D printer to form a subsequent layer; and
allowing the first, previous, and subsequent layers to crosslink to obtain the silicone elastomer article,
wherein the first and second silicone compositions are crosslinkable through addition reactions,
wherein the first and second silicone compositions each have a viscosity ratio greater than 45, the viscosity ratio being a ratio of the dynamic viscosity of a silicone composition at a low shear rate of 0.5 s$^{-1}$ and at a high shear rate of 25 s$^{-1}$, and
wherein the first and second silicone compositions each comprise:

at least one organopolysiloxane compound A comprising, per molecule, at least two $C_2$-$C_6$ alkenyl radicals bonded to silicon atoms, at least one organohydrogenopolysiloxane compound B comprising, per molecule, at least two hydrogen atoms bonded to an identical or different silicon atom, at least one catalyst C consisting of at least one metal or compound from the platinum group, at least one reinforcing silica filler D, at least one organopolysiloxane-polyoxyalkylene copolymer E, wherein the organopolysiloxane-polyoxyalkylene copolymer E is a branched organopolysiloxane-polyoxyalkylene copolymer comprising at least one T and/or one Q siloxy unit with Q corresponding to the siloxy unit $SiO_{2/2}$ and T corresponding to the siloxy unit $R^1SiO_{3/2}$ where $R^1$ is independently selected from a hydrocarbon-based group containing from 1 to 30 carbon atoms, and at least one crosslinking inhibitor F.

16. The method according to claim 1, wherein the first and second silicone compositions each have a viscosity ratio greater than 50.

17. The method according to claim 13, wherein each silicone composition comprises: a 1:1 ratio of a first stock composition and a second stock composition, the first stock composition comprising:

about 99 wt % of a first reagent composition comprising the at least one organopolysiloxane compound A, the at least one catalyst C, and the at least one reinforcing silica filler D; and about 1 wt % of a second reagent composition comprising $Me_3SiO[Me_2SiC]_{75}[MeSi((CH_2)_3—(OCH_2CH_2)_{22}(OCH_2(CH_3)CH)_{22}—OH)O]_7SiMe_3$, and the second stock composition comprising the at least one organohydrogenopolysiloxane compound B and the at least one crosslinking inhibitor F base.

18. The method according to claim 13, wherein each silicone composition comprises: a 1:1 ratio of a first stock composition and a second stock composition, the first stock composition comprising:

about 98 wt % of a first reagent composition comprising the at least one organopolysiloxane compound A, the at least one catalyst C, and the at least one reinforcing silica filler D; and about 2 wt % of a second reagent composition comprising $Me_3SiO[Me_2SiC]_{75}[MeSi((CH_2)_3—(OCH_2CH_2)_{22}(OCH_2(CH_3)CH)_{22}—OH)O]_7SiMe_3$, and the second stock composition comprising the at least one organohydrogenopolysiloxane compound B and the at least one crosslinking inhibitor F base.

* * * * *